United States Patent

Hall et al.

[15] 3,661,257

[45] May 9, 1972

[54] PART CLASSIFYING DEVICE

[72] Inventors: Maclin S. Hall, Okemos; Robert H. Moore, Williamston, both of Mich.

[73] Assignee: Owens-Illinois, Inc.

[22] Filed: Oct. 24, 1969

[21] Appl. No.: 869,190

[52] U.S. Cl. .................................................209/101
[51] Int. Cl. .................................................B07b 13/04
[58] Field of Search....................209/101, 97, 99, 106, 107

[56]  References Cited

UNITED STATES PATENTS

| 932,783 | 8/1909 | Johnson | 209/101 |
|---|---|---|---|
| 1,022,655 | 4/1912 | Brine | 209/101 |
| 1,139,714 | 5/1915 | Parker | 209/101 |
| 3,260,364 | 7/1966 | England | 209/107 |

Primary Examiner—Richard A. Schacher
Attorney—E. J. Holler and Donald K. Wedding

[57]  ABSTRACT

A device for classifying parts according to size by utilizing a motor rotated cylinder and a gauge blade, which is adjustable positioned relative to the periphery of the cylinder to form an open runway that progressively increases in size. A hopper with the parts to be classified, discharges the parts unto the runway and gravity and the rotating cylinder combine to cause the parts to move along the runway. When a part reaches an opening of a size corresponding to the part size, the part drops down into a bin which collects and stores all parts of this size. The same motor that rotates the cylinder is also employed to vibrate the hopper to facilitate the transfer of the parts from the hopper unto the runway.

10 Claims, 3 Drawing Figures

INVENTORS
Maclin S. Hall, &
BY Robert H. Moore
E.J.Holler & D.K.Wedding
ATTORNEYS

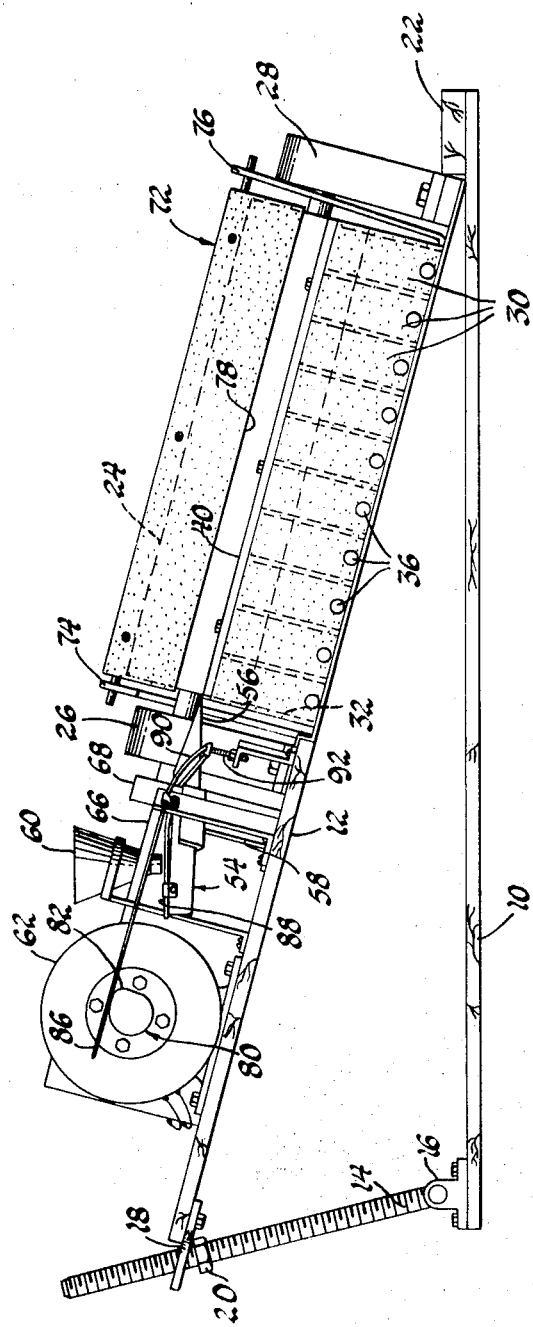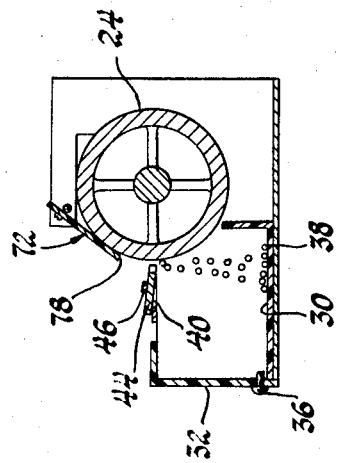

PART CLASSIFYING DEVICE

This invention relates to improvements in part size classifying devices, adapted, although not exclusively for classifying relatively small parts.

The sorting or classifying of parts of spherical and plural sided shapes, e.g., balls, rods, cylinders, wafers, etc., when small, presents both handling and accurate measuring problems. By way of example, if glass or plastic beads are to be of some precise dimension, such as 9 mils, for purposes of accurate spacing of adjacent parts, a screen might be used which had openings of 9 mils. The beads to be classified would be placed on this screen and as this screen is manipulated those beads over 9 mils would be retained by the screen, while those under, would pass through the 9 mil openings. Next it would be necessary to rescreen the beads, which had been determined to be 9 mils or under in size, with another screen that perhaps had openings of 8.9 mils. Those beads which would be retained by the 8.9 mil opening screen could be expected to have approximately a 9 mil size. This method as can be appreciated is time consuming, and also of questionable accuracy since the screen openings tend to distort and increase in size during usage and the beads tend to become trapped in the openings. Devices proposed for overcoming these problems are generally complicated as well as relatively costly.

With the foregoing in mind, a new and different part size classifying device is contemplated that is simple in construction and versatile in application, such that it can be used to classify parts of the varied shapes and sizes.

Also contemplated is a part size classifying device that utilizes gravity and a rotating cylinder to generate part movement along a runway, where the parts are classified as to size.

A related objective is a unique provision for utilizing a motor, both to rotate the cylinder, and also to vibrate a parts hopper to facilitate the transfer of the parts from the hopper onto the runway.

Another objective is a part size classifying device that is easily adjusted and can be employed to classify parts of several different sizes and shapes over a relatively large range.

A further objective is a part size classifying device that affords a runway with a progressively increasing size opening through which parts of corresponding size drop into bins provided for collecting parts of that size.

The foregoing and other objects and advantages of the invention will become apparent from the following description and the accompanying drawings in which:

FIG. 2 is a side elevational view of the device; and

FIG. 3 is a sectional view of the device taken along line 3—3 in FIG. 1.

Figure 1:
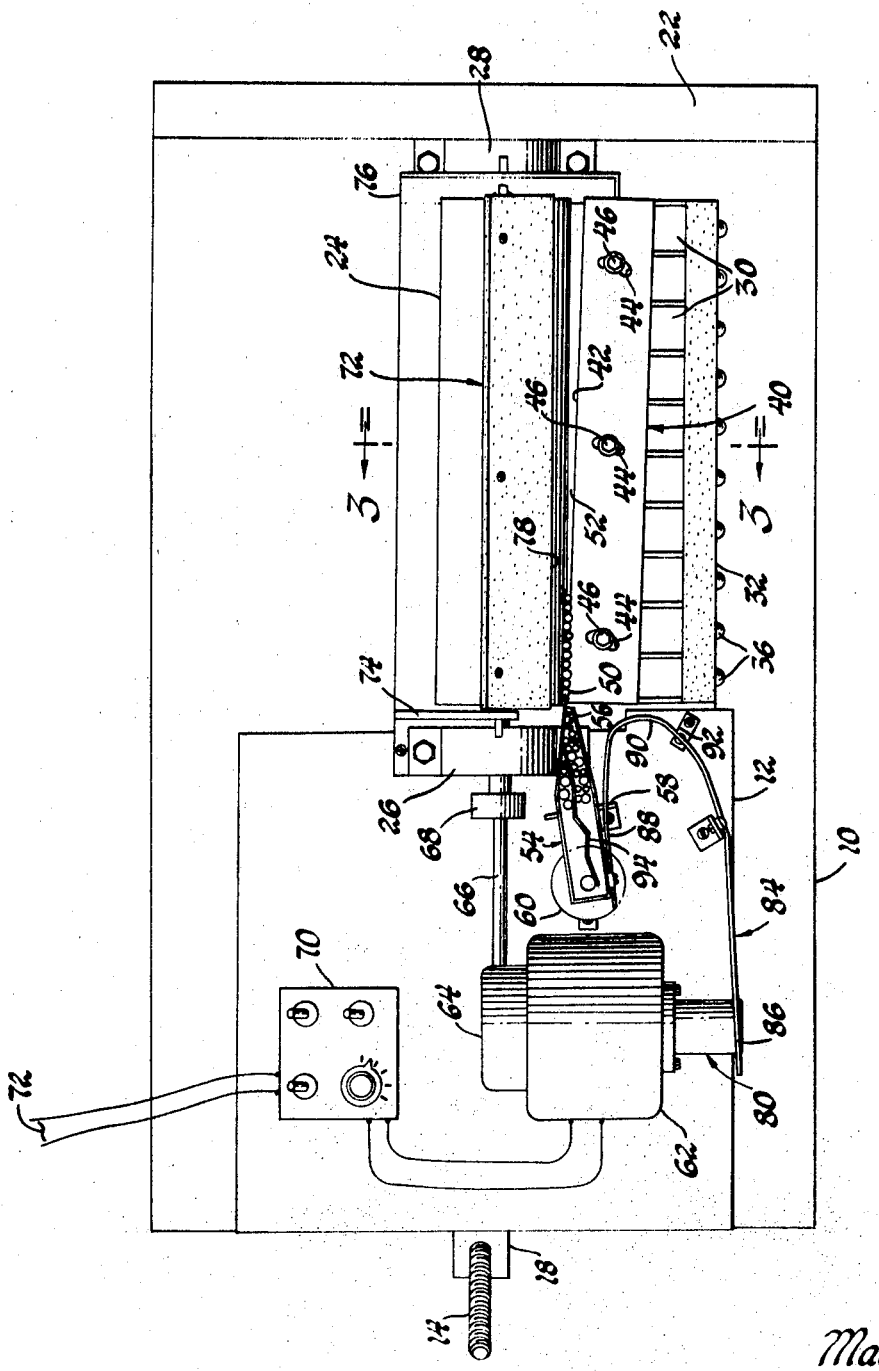
FIG. 1 is a top elevational view, partially, schematic of a part size classifying device, incorporating the principles of the invention.

Referring to the drawings in detail and initially to FIGS. 1 and 2, the numeral 10, denotes a base on which is positioned a support or platform 12. The platform 12 has one end elevated by an elongated threaded bolt 14 which is swivelly connected to the base 16. The bolt 14 extends through an opening in an end plate 18 on the platform 12. This end plate 18 engages a nut 20 on the bolt 14; thus, as the nut 20 is moved up and down on the bolt 14 the elevation of the platform 12 can be changed, as will become apparent, to increase or decrease the speed at which parts are fed. The opposite end of the platform abuts a stop 22. By employing this arrangement including the base 10 and the elongated threaded bolt 14, the device is conveniently transportable to different locations. Of course, if this feature is not required, the device can be permanently attached to something that would serve as a base, and also if the angle of the platform 12 would not require adjustment, this angle could be fixed in any appropriate way.

Rotatably positioned on the platform 12 is a cylinder 24. The cylinder 24 is journaled to the platform 12 at its opposite ends by suitable bearings 26 and 28. The cylinder 24 should have a relatively good finish on the periphery for accuracy and wear inhibiting purposes, and therefore can be formed of stainless steel or any other material that can be accurately machined and polished. Also the cylinder 24 is shown as hollow, but it could be solid or partially solid.

As viewed in FIG. 3 the cylinder 24 has positioned to the side and partially below it, a series of bins 30. These bins 30 are closed by an end cover 32 that, if required, may be held in place by screws or the like. The parts can be withdrawn from each bin 30 through openings which are normally closed by stop pins 36.

A gauge blade designated by the numeral 40 has a hardened gauge edge 42 and slots 44 through which extend screws 46. These screws 46 attach to the gauge blade 40 to the bins 30 or some part of the support for the cylinder 24, and also permit adjustment of the gauge edge 42 with respect to the periphery of the cylinder 24 together form a parts runway 48 with a parts entrance at 50. The parts runway 48 has along its length a V-shaped opening 52. The size of this V-shaped opening 52 can be established by adjusting the gauge edge 42 relative to the periphery of the cylinder 24 with feeler gauges or the like. The opening 52 could have the same dimensions along its entire extent but with a V-shaped opening as the parts proceed along the runway 48, the smaller parts first drop into the bins 30 and then subsequently the larger parts. In this way a parts sizing takes place over whatever the selected range is. Also, the blade 40 can be slightly tilted as shown in FIG. 3 by shim's to further facilitate part movement.

The parts for illustration purposes and without limitation are shown as spheroids or balls, but could be plural sided and in the form of rods, cylinders, wafers, squares, rectangles, including tapers, etc. These parts are supplied to the parts runway entrance 50 from a hopper 54, which has its exit end at 56, communicating with the entrance 50. The hopper 54 is supported on the platform 12 by a bracket 58 that permits the hopper 54 to be vibrated, as will be further discussed. Any appropriate provision can be made for supplying the parts to the hopper 54, e.g., a funnel shaped storage bin 60 may be positioned above the hopper 54 so that by gravity the parts to be sized flow into the end of the hopper 54.

The cylinder 24 is rotated by a motor shown at 62. The motor 62 may be of any suitable kind. In the FIG. 1 embodiments; the motor 62 is electrically operated and is drive connected to the cylinder 24 through suitable direction changing gearing 64 and a drive shaft 66, which is connected to the cylinder 24 by a coupling 68. The gearing 64 can be eliminated if the direction change is not required.

An appropriate motor controller 70 is connected to an AC source 72, which typically provides 60 cycle power at 115 volts. By operating the controller 70, the motor 62 can be operated to rotate the drive shaft 66 at different selected speeds.

During operation the cylinder 24 revolves outwardly and upwardly relative to the gauge blade 40. As viewed in FIG. 3, this is in a clock-wise direction and assures that the parts are not forced into the V-shaped opening 52 and damaged.

Because of this direction of rotation, there is a tendency with certain type parts for the parts to attach themselves to the periphery of the cylinder 24 as it rotates. To prevent this, a scraper blade shown at 72 is pivotably secured at its ends to upstanding flanges 74 and 76 on the platform 12. In its FIG. 3 position a scraper blade edge denoted at 78 will engage any part that attaches to the periphery of the cylinder 24 and remove it so that it will drop down unto the runway 48. The scraper blade 72 is manually movable into and out of the wiping position but can be spring biased to the wiping position or even mechanically or otherwise maintained in this latter position.

To facilitate the transfer of the parts from the hopper 54 to the runway 48, the hopper 54 can be vibrated in various known ways, such as ultra-sonically or mechanically. In the FIG. 1 embodiment the motor 62 is used for this purpose. As depicted in FIG. 2 the end of the motor 62 has a cam 80 with an off-set portion 82. A flexible rod 84, which is suspended on the platform 12 between its ends 86 and 88, has the end 86 riding on the surface of the cam 80. The other end 88 is attached or loosely engages, the side of the hopper 54.

For adjustment purposes, the flexible rod 84 has a loop 90 that can be raised or lowered by an adjusting screw 92 to vary the extent or amplitude of the vibrations generated when the offset portion 82 of the cam 80 moves the end 88 up and down. These up and down movements are transferred to the end 88 and generate the vibrations of the hopper 54 so as to urge the parts out the exit end 56 and unto the runway 48. If the amplitude of these vibrations is not proper, the adjusting screw 92 is adjusted to raise or lower the loop 90.

Also facilitating an orderly progression of the parts 38 from the exit 56, of the hopper 54 is an elongated member 94 which is formed of relatively thin, flat stock. This elongated member 94, has bends therein, and is placed in the hopper 54 for the parts so that during operation the elongated member 94 prevents the small parts from piling up, particularly in the vicinity of the exit 56.

In operation, the gauge blade 40 is first adjusted to establish the desired dimensions at each of the ends so that the openings opposite the bins 30 have a dimension that corresponds to the size of the parts to be collected in that bin 30. Also the nut 20 on the rod 14 is adjusted so that the end of the platform 12 is elevated sufficiently for achieving the desired speed of movement of the parts along the runway 48. Next the parts are transferred from the storage bin 60 to the hopper 54 and then the motor controller 70 is adjusted to start the motor 62 operating at the desired drive speed for the cylinder 24. The motor 62 will vibrate the hopper 54 and the parts will enter at the runway entrance 50. The parts now move along the runway 40 due to the combination of gravity forces and the rotation of the cylinder 24, i.e., the rotation of the cylinder 24 revolves the parts and gravity imposes the force that causes the parts to move down the runway 48. As a certain size part reaches an opening with a corresponding size, the part will drop down into the bin 30, which is to collect parts of this size. This will continue until all of the parts placed in the hopper 54 are in one of the bins 30. Those parts that are oversize, or larger than the maximum opening accumulate at the exit of the V-shaped opening 50 and may be directed by the upright flange 76 to some collecting station (not shown). Also, during this operation if any of the parts stick to the periphery of the cylinder 24, they will be removed by the scraper blade 72 and drop back unto the runway 48 so that they can be sized. At the completion of a run the now properly sized parts can be removed from each of the bins 30 after separating the stop pins 36 from the bin openings. In the event that it is desired to further classify the undersize and oversize parts, they can be collected and run through separate appropriately adjusted classifying devices or rerun through the same devise after the proper adjustments are made.

Without limitation and for demonstration purposes only, glass and plastic beads have been classified employing a cylinder 24 that had a 2 ½ inch diameter and was 8 inches long. The motor 62 used was of the DC shunt wound type, and was a model 2T60-100 made by the Gerald K. Heller Company, Las Vegas, Nevada. This model includes the gearing 64, and provided a choice of speeds at the drive shaft 66 from 0 to 40 rpm in either direction at an approximate torque of 3.7 inch pounds. The motor controller 70 was model S-10 made by the same company. The platform 12 was inclined approximately 20° with respect to the base 10 and the gauge blade 40 was adjusted so that at the entrance end 50, the opening was 9 mils and at the exit end the opening was 9.5 mils. Ten bins 30 were used and the cylinder 24 was rotated at between 10 and 12 rpm by the aforementioned motor 62. To reduce adhesion of the beads to the cylinder 24 and to the gauge blade 40, the device was operated in an environment with a relative humidity of approximately 20 percent.

The invention is to be limited only by the following claims.

What is claimed is:

1. In a device for classifying parts according to size, the combination of a base, a support having an end thereof adjustably elevated relative to the base, a cylinder rotatably positioned on the support so that the part entrance end thereof is elevated above the other end thereof, a series of part receiving bins positioned on the platform and extending from the entrance end to the other end of the cylinder, a gauge blade adjustably positioned relative to the bins and the periphery of the cylinder so that an edge thereof forms a parts runway on one side of the cylinder with an opening therebetween of a predetermined increasing size from the part entrance to the other end of the cylinder, a hopper containing parts to be sized, the hopper being arranged on the support with the exit thereof opening into the entrance end of the cylinder so that parts proceed therefrom and along the runway until the part size corresponds to the opening size and the part drops therethrough into the bin for that size part, a motor mounted on the support and drive connected to the cylinder so as to rotate the cylinder, motor controller means varying the speed, a scraper blade positioned relative to the periphery of the cylinder and the runway to remove parts attaching to the cylinder periphery, means vibrating the hopper, the hopper vibrating means including an offset cam member drive connected to a motor, a flexible rod-like member mounted between the ends thereof on the support and having the opposite ends respectively engaging the cam and the hopper so as to vibrate the hopper when the motor is operated, and means coacting with the rod-like member to adjust the amplitude of the vibrations imposed on the hopper.

2. A device as described in claim 1 wherein the hopper is elongated and includes an elongated member positioned lengthwise in the hopper to facilitate the alignment of parts discharged unto the runway.

3. A device for classifying elements by size comprising, in combination,
   a. support means,
   b. a cylinder rotatably mounted on the support means and having a substantially straight line profile peripheral surface,
   c. means for rotating the cylinder,
   d. an elongated gauge blade having a gauge edge,
   e. adjustment means for mounting said gauge blade on said support means with said gauge edge facing the peripheral surface of said cylinder to form a runway for said elements therebetween, and
   f. means for feeding said elements onto said runway at one end thereof,
   g. said adjustment means being adapted to support said gauge blade at a slight tilt with respect to the horizontal to maintain said elements against the peripheral surface of said cylinder and to permit movement during adjustment of said gauge blade along a flat plane extending away from the peripheral surface of said cylinder, one end of said elongated gauge blade being independently adjustable with respect to the opposite end thereof whereby the width of the runway opening between the gauge edge and the peripheral surface of said cylinder may be independently adjusted at the opposite ends thereof so that said runway opening may be of a predetermined increasing size extending from said one end to the opposite end thereof and said elements will pass between said peripheral surface of the cylinder and said gauge edge at various points along said runway depending upon the size of each element.

4. A classifying device as described in claim 3, further comprising a scraper element having an edge thereof positioned relative to the periphery of the cylinder so as to separate parts from the cylinder periphery as the cylinder is rotated.

5. A classifying device as defined in claim 3 further comprising means for receiving the elements passing through said runway opening.

6. A classifying device as defined in claim 5 wherein said receiving means comprises a plurality of compartments arranged in a row beneath the runway opening, each compartment receiving a different size element dependent upon the width of the runway opening immediately above each compartment.

7. A classifying device as defined in claim 3 wherein said feed means comprises a hopper having an outlet positioned adjacent said one end of the runway opening.

8. A classifying device as defined in claim 7 further comprising means operated by the means for rotating the cylinder for vibrating said hopper to facilitate the discharge of the elements from the hopper.

9. A classifying device as defined in claim 8 wherein said hopper vibrating means comprises an offset cam member drive connected to the means for rotating the cylinder, a flexible rod-like member extending between said cam and said hopper so as to vibrate the hopper, and means coacting with the rod-like member to adjust the amplitude of the vibrations imposed on the hopper.

10. A classifying device as defined in claim 9 wherein said hopper is elongated and includes an elongated member positioned lengthwise in the hopper to facilitate the alignment of elements discharged onto said runway opening.

* * * * *